(12) United States Patent
Atmur

(10) Patent No.: US 10,454,404 B2
(45) Date of Patent: Oct. 22, 2019

(54) GENERATOR FIELD EXCITER SYSTEM

(71) Applicant: THE BOEING COMPANY, Chicago, IL (US)

(72) Inventor: Robert J. Atmur, Whittier, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/821,735

(22) Filed: Nov. 22, 2017

(65) Prior Publication Data

US 2019/0158003 A1 May 23, 2019

(51) Int. Cl.
*H02P 9/00* (2006.01)
*H02P 6/00* (2016.01)
*H02K 15/00* (2006.01)
*B64D 27/24* (2006.01)

(52) U.S. Cl.
CPC .............. *H02P 9/007* (2013.01); *B64D 27/24* (2013.01); *H02K 15/0006* (2013.01); *H02P 6/005* (2013.01)

(58) Field of Classification Search
CPC ................................ H02P 9/009; H02P 6/005
See application file for complete search history.

(56) References Cited

U.S. PATENT DOCUMENTS

| | | | | |
|---|---|---|---|---|
| 4,695,939 A * | 9/1987 | Canay | ..................... | H02P 25/03 322/58 |
| 4,816,756 A * | 3/1989 | Fox | ..................... | G01R 31/2632 318/490 |
| 5,656,922 A * | 8/1997 | LaVelle | ................. | H02J 7/1423 310/181 |
| 5,714,821 A * | 2/1998 | Dittman | ................. | H02K 19/28 30/180 |
| 7,132,816 B1 * | 11/2006 | Markunas | ............... | H02P 21/00 318/400.02 |
| 2004/0085047 A1 * | 5/2004 | Suzuki | ...................... | H02P 9/00 322/20 |
| 2005/0156543 A1 * | 7/2005 | Kitamura | .................. | H02J 7/16 318/109 |
| 2005/0216225 A1 * | 9/2005 | Anghel | .................. | H02P 6/181 702/151 |
| 2008/0079375 A1 * | 4/2008 | Seguchi | ............... | H02K 21/042 318/139 |
| 2008/0303490 A1 * | 12/2008 | Xu | ......................... | H02K 19/26 322/29 |
| 2009/0243417 A1 * | 10/2009 | Xu | .......................... | H02K 7/20 310/184 |
| 2010/0308581 A1 * | 12/2010 | Anghel | .................... | F02C 7/275 290/31 |
| 2012/0007428 A1 * | 1/2012 | Rozman | .................... | H02J 3/36 307/66 |
| 2012/0299515 A1 * | 11/2012 | Markunas | ................. | H02P 6/18 318/400.11 |

(Continued)

*Primary Examiner* — Sean Gugger
(74) *Attorney, Agent, or Firm* — Yee & Associates, P.C.

(57) ABSTRACT

A method to provide control for an alternating current generator. The method includes controlling the alternating current generator by modulating a three-phase wound rotor to counter-rotate the magnetic field relative to a shaft rotation, or alternatively to become synchronous to the shaft rotation. The three-phase wound rotor controls a frequency and a voltage of the alternating current generator.

20 Claims, 3 Drawing Sheets

(56) References Cited

U.S. PATENT DOCUMENTS

| | | | |
|---|---|---|---|
| 2013/0193888 A1* | 8/2013 | Markunas | H02P 6/18 |
| | | | 318/400.33 |
| 2014/0343739 A1* | 11/2014 | Masson | H02P 9/10 |
| | | | 700/287 |
| 2015/0054373 A1* | 2/2015 | Mane | H02K 31/02 |
| | | | 310/156.37 |
| 2015/0244303 A1* | 8/2015 | Gao | F02N 11/04 |
| | | | 290/32 |
| 2016/0248359 A1* | 8/2016 | Shiomi | H02P 9/08 |
| 2018/0034385 A1* | 2/2018 | Huang | H02M 7/797 |
| 2018/0258848 A1* | 9/2018 | Karam | F02C 6/16 |

* cited by examiner

GENERATOR FIELD EXCITER SYSTEM

BACKGROUND INFORMATION

1. Field

The present disclosure relates to methods and devices for replacing brushed or brushless direct current field exciters with a three-phase exciter and motor controller to provide voltage and frequency control of a generator. Thus, the illustrative embodiments relate to a generator field exciter system.

2. Background

In electric motor design, designing motors at the megawatt level can be difficult because of the required motor control. In an aircraft environment, providing such motor control is especially difficult, as there is a need for high power motor control without the use of exceptionally high voltage and high current components, which require large and heavy equipment and cooling systems, both of which are in short supply on an aircraft.

SUMMARY

The illustrative embodiments provide for a method to provide control for an alternating current generator. The method includes controlling the alternating current generator by modulating a three-phase wound rotor to counter-rotate the magnetic field relative to a shaft rotation, or alternatively to become synchronous to the shaft rotation. The three-phase wound rotor controls a frequency and a voltage of the alternating current generator.

The illustrative embodiments also provide for a method of manufacturing an electric motor. The method includes building the electric motor and replacing a field exciter of the electric motor with a three-phase exciter and motor controller.

The illustrative embodiments also provide for a system for generating an alternating current in an electric motor using a motor controller and a first power level equal to or less than a tenth of a second power level generated by the electric motor. The system includes the electric motor. The electric motor is configured to generate the first power level. The system also includes the motor controller. The motor controller includes a three-phase exciter that operates at the second power level. The three-phase exciter is in electromagnetic communication with the electric motor such that operation of the three-phase exciter controls a voltage and a frequency of an output of the electric motor.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
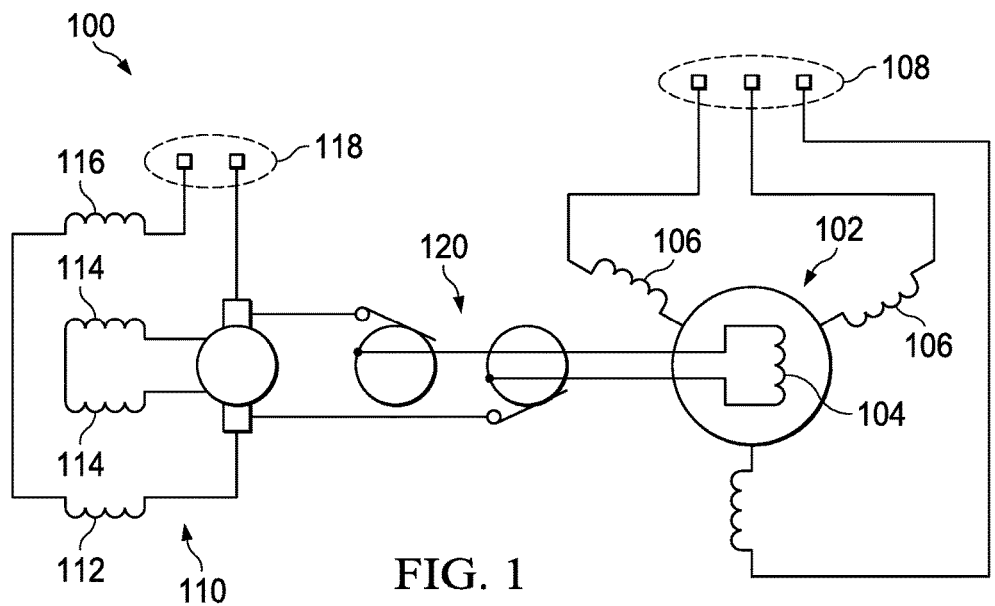
FIG. 1 illustrates a motor and controller for generating an alternating current, along with a motor controller, in accordance with an illustrative embodiment.

The illustrative embodiments recognize and take into account that, there is interest in an electric primary propulsion system for a commercial aircraft at the two to three-megawatt level. For purposes of this document, any power requirement greater than one megawatt is considered a "high" power level. The illustrative embodiments further recognize and take into account that providing motor control at a high-power level is very difficult, and to do it in an aircraft environment is even harder. Thus, the illustrative embodiments recognize and take into account that what is needed is high power motor control without the use of exceptionally high voltage and high current components.

The illustrative embodiments recognize and take into account that several proposed solutions use newer low technology readiness level switching technologies to support a motor control system in the 1200V to 3600V voltage range. However, physically, these devices are large and require significant cooling during operation. Physical separation requirements are additionally significant and difficult to manage in aircraft. Additionally, aircraft require a high technology readiness level due to the high degree of reliability and performance needed in aircraft, and technologies for implementing such large voltage control systems do not exist in aircraft because of the weight and size of comparable terrestrial land systems.

The motor control system of the illustrative embodiments therefore replaces the fixed pole rotor of a field controlled generator with a three-phase wound rotor where the current in the rotor is modulated to either counter-rotate relative to the shaft rotation or become synchronous to the shaft rotation. This arrangement provides the ability to control both the frequency and voltage of a generator in the two to three-megawatt range by controlling a few hundred watts of power. Thus, the illustrative embodiments effectively create a very high-power gain amplifier out of a generator that could be used in an application of converting fuel into electrical power. The illustrative embodiments further reduce or eliminate the need for high power electronics, along with reducing weight and system complexity.

Stated differently, the motor controller of the illustrative embodiments replaces a typical brushed or brushless direct current field exciter with a three-phase exciter and motor controller to provide both voltage and frequency control of a generator. This motor controller manages the rate at which the magnetic field rotates relative to an armature rotation rate. The sum of such rates controls the effective rate of change of flux around the stator, thereby directly controlling both the voltage produced and the frequency at which the voltage is produced.

The motor controller of the illustrative embodiments may be implemented using three coils. Each coil is a pair: one that produces a "positive", or north pole, and one that produces a "negative", or south pole. The generator can then be directly controlled using low power signals by using a three-phase generator and mechanical position feedback to control the three-phase signal's effective direction and phase relationship to the rotating armature. This arrangement avoids the use of (or reduces the need for) physically large, complex and high voltage components.

FIG. 1 illustrates a motor and controller for generating an alternating current, along with a motor controller, in accordance with an illustrative embodiment. System 100 may be considered an electric motor and a controller for controlling the electric motor. As used herein, the term "AC" refers to "alternating current."

System 100 includes AC generator 102. AC generator 102 includes rotating field windings 104 electrically connected to alternator armature windings 106 and to AC power output terminals 108.

AC generator 102 may be controlled using controller system 110. Controller system 110 includes exciter generator 112, exciter armature 114, exciter field windings 116 and exciter control terminals 118. In use, controller system 110 may be used to control an exciter field which, in turn, controls the production of current in AC generator 102. Pole 120 is a fixed pole in this configuration.

Figure 2:
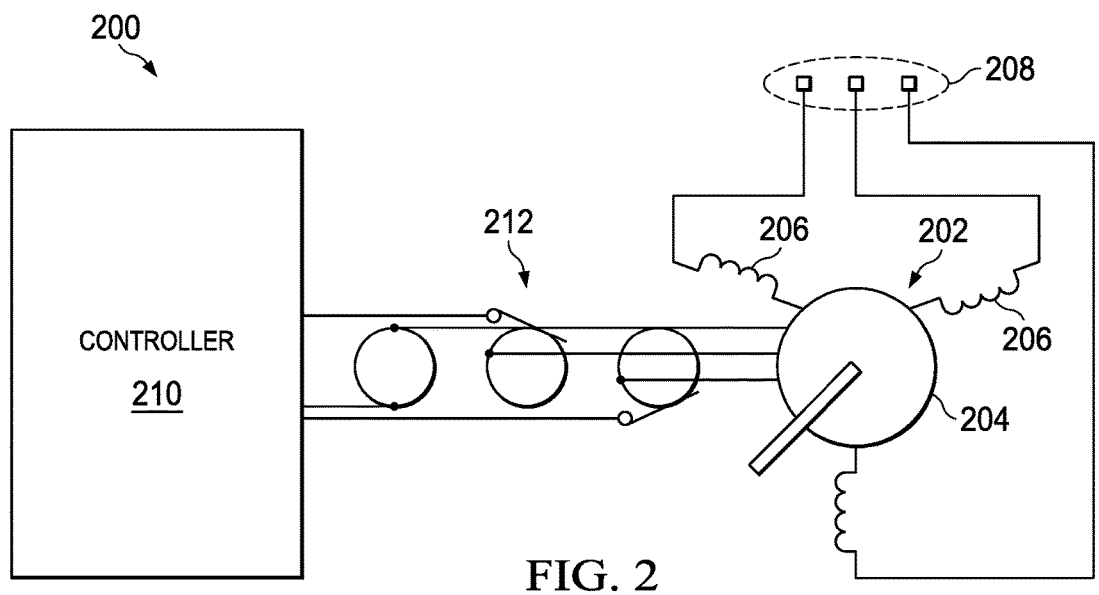
FIG. 2 illustrates another motor and controller for generating an alternating current, along with a motor controller, in accordance with an illustrative embodiment.

FIG. 2 illustrates a motor and controller for generating an alternating current, along with a motor controller, in accordance with an illustrative embodiment. System 200 is a variation of system 100 of FIG. 1. A difference between system 100 of FIG. 1 and system 200 of FIG. 2 is replacing a fixed pole rotor of a field controlled generator (FIG. 1) with a three-phase wound rotor (FIG. 2).

Like system 100 of FIG. 1, system 200 includes AC generator 202. AC generator 202 includes rotating field windings 204 electrically connected to alternator armature windings 206 and to AC power output terminals 208.

However, controller 210 is different than controller system 110 of FIG. 1. Controller 210 is a three-phase generator which tracks rotor position. Position feedback from AC generator 202 is fed into controller 210, which is used to provide additional control to AC generator 202. Controller 210 manages the rate at which the magnetic field rotates relative to an armature rotation rate using three-phase wound rotor 212. The sum of such rates (i.e., the rate at which the magnetic field rotates and the armature rotation rate) controls the effective rate of change of flux around the stator, thereby directly controlling both the voltage produced and the frequency at which the voltage is produced. This principle is described in more detail with respect to FIG. 3.

Figure 3:
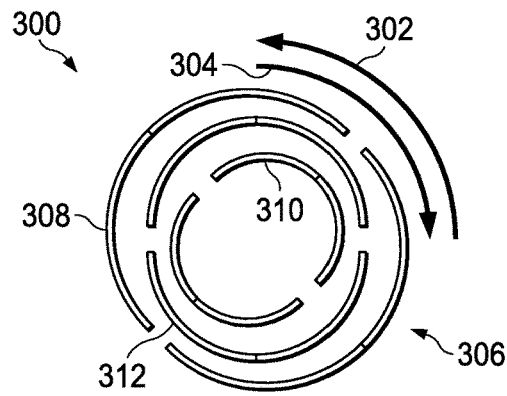
FIG. 3 illustrates the relationship between mechanical rotation, electrical rotation, and magnetic rotation of an electric motor during operation, in accordance with an illustrative embodiment.

FIG. 3 illustrates the relationship between mechanical rotation, electrical rotation, and magnetic rotation of an electric motor during operation, in accordance with an illustrative embodiment. Field configuration 300 may be an example of a field configuration for an AC electric motor, such as AC generator 202 of FIG. 2.

Arrow 302 represents mechanical rotation of the armature coils counter-clockwise. Arrow 304 represents electrical rotation of the electrical field of the motor clockwise. These directions could be reversed, but they are opposed to each other. Curved lines 306 represent the phases of a three-phase current which energizes the armature coils. Curved line 308 represents an "A" phase of the current, curved line 310 represents a "B" phase of the current, and curved line 312 represents a "C" phase of the current. Again, the armature coils are energized by the three-phase current. This electrical rotation is used to control the AC motor, rather than mechanical armature rotation.

The effective rate of magnetic field rotation is the difference in the sum of mechanical and electrical rotation. Thus, $\omega_{mag} = \omega_M + \omega_E$, where the term "$\omega$" is the rate of rotation such that $\omega_{mag}$ is the rate of rotation of the magnetic field, $\omega_m$ is the mechanical rate of rotation, and WE is the rate of rotation of the electric field. The magnetic rotation rate sets the voltage and frequency of the generator output; $V = d\phi/dt$, where the term "V" is the voltage, the term "$\phi$" is the frequency of generator output, the term "t" is time, and wherein the term "$d\phi/dt$" is a mathematical expression meaning the change of generator output with respect to time. The frequency equals the number of poles of the motor divided by the value of $2 * \omega_{mag}$.

Figure 4:
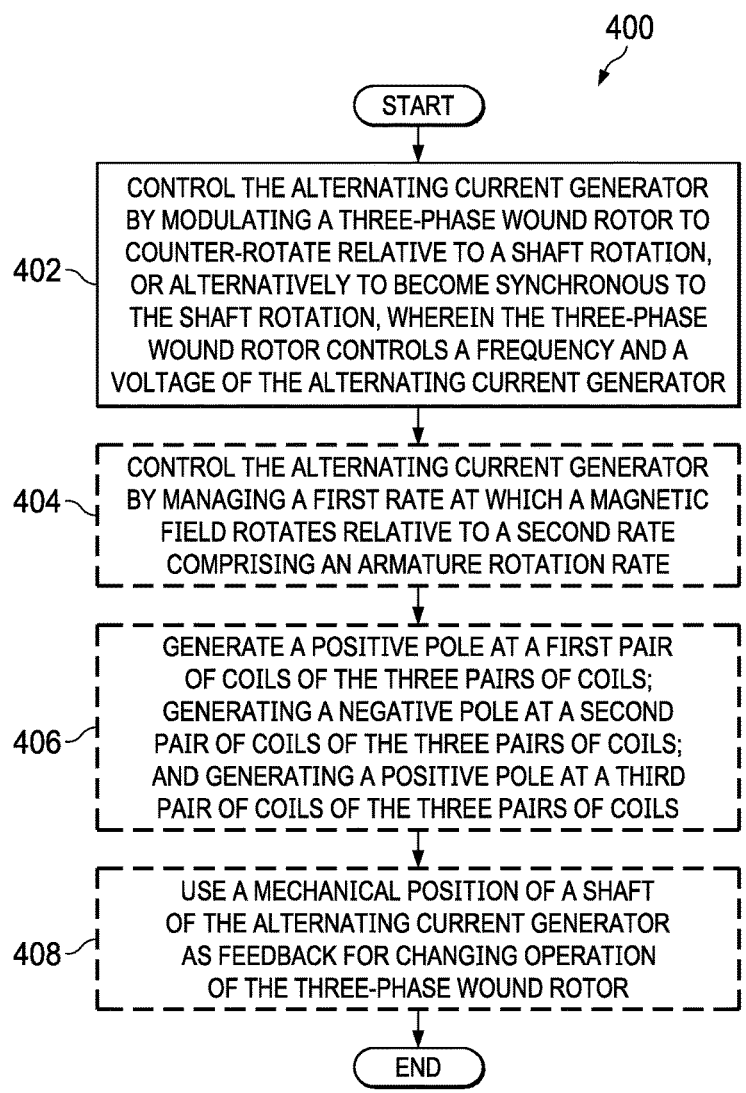
FIG. 4 is a flowchart of a method of providing control for an alternating current generator, in accordance with an illustrative embodiment.

FIG. 4 is a flowchart of a method of providing control for an alternating current generator, in accordance with an illustrative embodiment. Method 400 may be implemented using the devices described above with respect to FIG. 1 through FIG. 3.

In one illustrative embodiment, method 400 may be a single step. In particular, method 400 may include controlling the alternating current generator by modulating a current in a three-phase wound rotor to counter-rotate relative to a shaft rotation, or alternatively to become synchronous to the shaft rotation, wherein the three-phase wound rotor controls a frequency and a voltage of the alternating current generator (operation 402). In one illustrative embodiment, the method may terminate thereafter.

However, method 400 may be varied. For example, the generator may generate power in a range of two megawatts to three megawatts, and the power is controlled with less than three hundred watts of power.

Method 400 may include additional operations which are optional, and thus shown in dashed boxes. For example, method 400 may include controlling the alternating current generator by managing a first rate at which a magnetic field rotates relative to a second rate comprising an armature rotation rate (operation 404). In this case, a sum of the first rate and second rate controls an effective rate of change of flux around a stator of the alternating current generator, thereby controlling both a voltage produced and a frequency at which the voltage is produced in the alternating current generator.

Method 400 may include different and further operations. For example, in an illustrative embodiment the three-phase wound rotor comprises three pairs of coils. In this case, method 400 may also include generating a positive pole at a first pair of coils of the three pairs of coils; generating a negative pole at a second pair of coils of the three pairs of coils; and generating a positive pole at a third pair of coils of the three pairs of coils (operation 406).

In a further illustrative embodiment to this example, method 400 may also include using a mechanical position of the shaft as feedback for changing operation of the three-phase wound rotor (operation 408). In this case, changing operation comprises changing a direction and a phase relationship of the three pairs of coils. Yet further, in another illustrative embodiment, changing the direction and the phase relationship directly controls generation of alternating current in the generator, and avoids use of high voltage components in a controller for the generator.

Other variations to method 400 are possible. For example, in an illustrative embodiment, modulating the three-phase wound rotor creates a rotation of an electrical field that opposes mechanical rotation of armatures in the alternating current generator. In another example, a magnetic rotation rate sets the frequency and the voltage.

Still other variations are possible. Therefore, the illustrative embodiments described with respect to FIG. 4 do not necessarily limit the claimed inventions.

Figure 5:
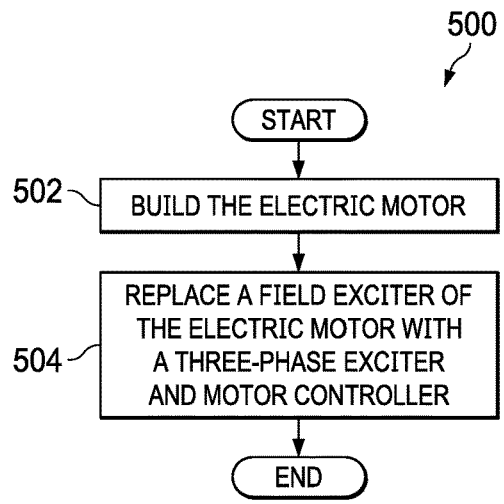
FIG. 5 is a flowchart of a method for manufacturing an electric motor, in accordance with an illustrative embodiment.

FIG. 5 is a flowchart of a method for manufacturing an electric motor, in accordance with an illustrative embodiment. Method 500 may be a method for building an electric motor which can accomplish the functions described above with respect to FIG. 1 through FIG. 4.

Method 500 includes building the electric motor (operation 502). Method 500 also includes replacing a field exciter of the electric motor with a three-phase exciter and motor controller (operation 504). In one illustrative embodiment, the method may terminate thereafter.

Method 500 may be varied. In one example, the motor may be built directly using the three-phase exciter, without replacing an exciting field exciter. In another example, an existing motor may be received as opposed to built and then the field exciter replaced with the three-phase exciter.

Other variations are possible. For example, in an illustrative embodiment, the electric motor may be a brushed motor. However, the electric motor also may be a brushless motor.

Still other variations are possible. Thus, the examples described with respect to FIG. 5 do not necessarily limit the claimed inventions.

Figure 6:
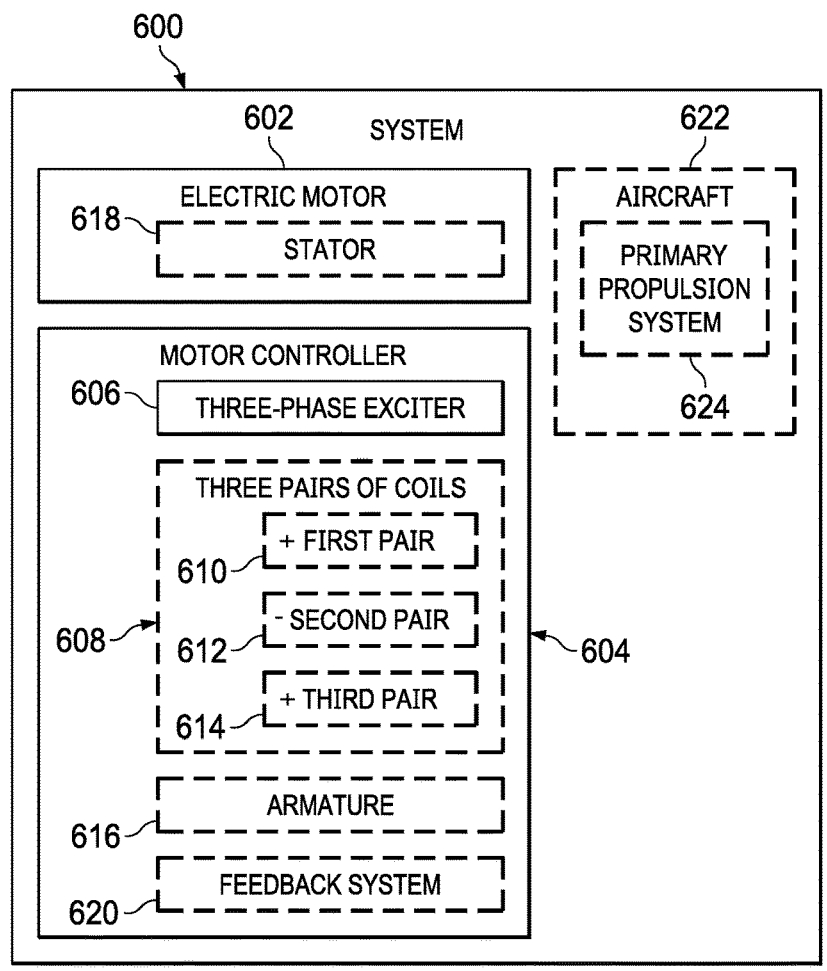
FIG. 6 is a system for generating an alternating current in an electric motor using a motor controller, in accordance with an illustrative embodiment.

FIG. 6 is a system for generating an alternating current in an electric motor using a motor controller, in accordance with an illustrative embodiment. System 600 may be a variation of the illustrative embodiments described with respect to FIG. 1 through FIG. 3. System 600 may be used to implement method 400 of FIG. 4. System 600 may be manufactured using method 500 of FIG. 5. Blocks illustrated with dashed lines are optional in some illustrative embodiments.

System 600 may be characterized as a system for generating an alternating current in an electric motor using a motor controller with a first power level equal to or less than a tenth of a second power level generated by the electric motor. System 600 includes electric motor 602. Electric motor 602 is configured to generate the second power level.

System 600 also includes motor controller 604. Motor controller 604 includes three-phase exciter 606. Three-phase exciter 606 operates at the first power level. Three-phase exciter 606 is in electromagnetic communication with electric motor 602 such that operation of the three-phase exciter controls a voltage and a frequency of an output of the electric motor.

System 600 may be varied. For example, motor controller 604 may be three pairs of coils 608. Three pairs of coils 608 form three poles, and wherein second pair 612 of the three pairs of coils forms a second pole in a direction opposite poles of first pair 610 and third pair 614 of three pairs of coils 608.

In another illustrative embodiment, three-phase exciter 606 manages a first rate at which a magnetic field in motor controller 604 rotates relative to second rate of an armature rotation of an armature 616 in the electric motor. In this case, electric motor 602 may also include stator 618, and wherein a sum of the first rate and the second rate controls a third rate of flux around the stator, thereby controlling both the voltage and the frequency. In a further illustrative embodiment, motor controller 604 may include feedback system 620 that measures a mechanical position of armature 616 to further control operation of three-phase exciter 606.

Other variations are possible. In another illustrative embodiment, system 600 also includes aircraft 622 on which electric motor 602 and motor controller 604 are installed. In this case, system 600 also includes primary propulsion system 624 connected to aircraft 622 and configured to propel aircraft 622. Electric motor 602 provides power to primary propulsion system 624.

Still other variations are possible. Thus, the examples described with respect to FIG. 6 do not necessarily limit the claimed inventions.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method to provide control for an alternating current generator, the method comprising:
   rotating an armature of a three-phase wound rotor at a first rate of rotation within the generator to produce a first alternating current from the generator, wherein the three-phase wound rotor comprises three pairs of coils;
   generating a first positive pole at a first pair of coils from the three pairs of coils;
   generating a negative pole at a second pair of coils from the three pairs of coils;
   generating a second positive pole at a third pair of coils from the three pairs of coils; and
   modulating a second current in the three-phase wound rotor by changing a direction and a phase relationship of the three pairs of coils to either counter-rotate relative to rotation of the rotor or rotate in synchrony with the rotor, wherein the modulation of the second current in the three-phase wound rotor controls a frequency and a voltage of the alternating current produced by the generator, wherein counter-rotation of the second current relative to the rotor reduces the frequency and voltage, and wherein synchronous rotation of the second current with the rotor increases the frequency and voltage.

2. The method of claim 1, wherein the alternating current generator generates power in a range of two megawatts to three megawatts, and wherein the three-phase wound rotor generates less than three hundred watts of power.

3. The method of claim 1, wherein modulating the second current in the three-phase wound rotor manages a first rate at which a magnetic field rotates relative to a second rate comprising an armature rotation rate.

4. The method of claim 3, wherein the magnetic rotation rate sets the frequency and the voltage.

5. The method of claim 3, wherein a sum of the first rate and second rate controls an effective rate of change of flux around a stator of the alternating current generator, thereby controlling both the voltage produced and the frequency at which the voltage is produced in the alternating current generator.

6. The method of claim 1, further comprising:
using a mechanical position of the three-phase wound rotor as feedback to control the second current's effective direction and phase relationship to the rotating armature.

7. The method of claim 1, wherein changing the direction and the phase relationship directly controls generation of alternating current in the generator and avoids use of high voltage components in a controller for the generator.

8. The method of claim 1, wherein modulating the second current in the three-phase wound rotor creates a rotation of an electrical field that opposes mechanical rotation of armatures in the alternating current generator.

9. The method of claim 1, wherein the three-phase wound rotor is installed on an aircraft.

10. The method of claim 9, wherein the generator provides power to a primary propulsion system connected to the aircraft.

11. A system for generating an alternating current, the system comprising:
an alternating current generator;
a three-phase wound rotor coupled to the generator, wherein the three-phase wound rotor comprises three pairs of coils which form three poles, wherein a second pair from the three pairs of coils form a second pole in a direction opposite a first pole from a first pair of coils and a third pole from a third pair of coils of the three pairs of coils, wherein rotation of an armature of the rotor within the generator is configured to produce a first alternating current from the generator; and
a motor controller coupled to the three-phase wound rotor, wherein the motor controller is configured to modulate a second current in the three-phase wound rotor by changing a direction and a phase relationship of the three pairs of coils, wherein the second current either counter-rotates relative to rotation of the rotor or rotates in synchrony with the rotor, wherein counter-rotation of the second current relative to the rotor reduces a frequency and voltage of the alternating current from the generator, and wherein synchronous rotation of the second current with the rotor increases the frequency and voltage of the alternating current from the generator.

12. The system of claim 11, wherein the motor controller modulates the second current in the three-phase wound rotor to manage a first rate at which a magnetic field in the motor controller rotates relative to a second rate of rotation of an armature in the electric motor.

13. The system of claim 12, wherein the generator further comprises a stator, and wherein a sum of the first rate and the second rate controls a third rate of flux around the stator, thereby controlling both the voltage and the frequency.

14. The system of claim 12, wherein the first rate sets the frequency and the voltage.

15. The system of claim 11, wherein the motor controller includes a feedback system configured to measure a mechanical position of the three-phase wound rotor as feedback to control the second current's effective direction and phase relationship to the rotating armature.

16. The system of claim 11, further comprising:
an aircraft on which the generator, the three-phase wound rotor, and the motor controller are installed; and
a primary propulsion system connected to the aircraft and configured to propel the aircraft, wherein the generator provides power to the primary propulsion system.

17. The system of claim 11, wherein the alternating current generator is configured to generate power in a range of two megawatts to three megawatts, and wherein the three-phase wound rotor is configured to generate less than three hundred watts of power.

18. The system of claim 11, configured such that changing the direction and the phase relationship directly controls generation of alternating current in the generator and avoids use of high voltage components in a controller for the generator.

19. The system of claim 11, wherein modulating the second current in the three-phase wound rotor creates a rotation of an electrical field that opposes mechanical rotation of armatures in the alternating current generator.

20. The system of claim 11, wherein the alternating current generator comprises rotating field windings electrically connected to armature windings, and wherein the armature windings are configured to be energized by the second current in the three-phase wound rotor.

* * * * *